United States Patent
Jin et al.

(10) Patent No.: US 10,447,133 B2
(45) Date of Patent: Oct. 15, 2019

(54) LINEAR MOTOR WITH ELECTRIC CURRENT INJECTION ASSEMBLY WITH SPRINGS CONNECTED TO MOVABLE COIL INSIDE A MASS BLOCK AND UPPER AND LOWER STATIONARY MAGNETS

(71) Applicant: JinLong Machinery & electronics CO., LTD, ZheJiang (CN)

(72) Inventors: Shaoping Jin, ZheJiang (CN); Shaobin Fang, ZheJiang (CN); Shi Chen, ZheJiang (CN)

(73) Assignee: JINLONG MACHINERY & ELECTRONICS CO., LTD, Zhejiang (CN)

( * ) Notice: Subject to any disclaimer, the term of this patent is extended or adjusted under 35 U.S.C. 154(b) by 102 days.

(21) Appl. No.: 15/442,435

(22) Filed: Feb. 24, 2017

(65) Prior Publication Data
US 2017/0288521 A1 Oct. 5, 2017

(30) Foreign Application Priority Data
Mar. 29, 2016 (CN) .......................... 2016 1 0187267

(51) Int. Cl.
*H02K 33/18* (2006.01)
*H02K 33/02* (2006.01)
(Continued)

(52) U.S. Cl.
CPC ............. *H02K 33/02* (2013.01); *H02K 33/18* (2013.01); *H02K 3/52* (2013.01); *H02K 5/225* (2013.01)

(58) Field of Classification Search
CPC  H02K 5/225; H02K 5/22; H02K 5/24; H02K 3/26; H02K 3/28; H02K 35/00;
(Continued)

(56) References Cited

U.S. PATENT DOCUMENTS 4,825,111 A * 4/1989 Hommes ............... B60L 15/005
104/290
7,291,956 B2 * 11/2007 Itoh .......................... H02K 3/26
310/208

(Continued)

*Primary Examiner* — Julio C. Gonzalez
*Assistant Examiner* — Maged M Almawri
(74) *Attorney, Agent, or Firm* — Oren Reches

(57) ABSTRACT

The present invention provides a linear motor, wherein, a coil is fastened on a mass block that is suspended inside a housing, a first magnet and a second magnet that have opposite magnetic poles are symmetrically disposed at an upper side and at a lower side relative to the coil in the middle and positioned parallel to the centric plane of the coil, by arranging an upper magnetic steel and a lower magnetic steel at an upper side and at a lower side relative to the mass block in the middle and parallel to the mass block. In the linear motor of the present invention, the design route that utilizes coil motion to drive mass block motion is different from the traditional route that utilizes magnet motion to drive mass block motion. When the coil moves to either of the two lateral sides of the housing, both the first magnet and the second magnet simultaneously generate forces along a vertical direction of the housing, and as the first magnet and the second magnet having opposite magnetic poles are symmetrically disposed on both sides of the coil, the electromagnetic forces generated by the two magnets are equal in magnitude and opposite in direction, thus being counterbalanced with each other in the vertical direction, so as to ensure that the coil only moves back and forth in a horizontal direction, without generating vibration in a vertical direction, therefore, no noise related to vertical vibration is caused.

11 Claims, 2 Drawing Sheets

(51) Int. Cl.
*H02K 3/52* (2006.01)
*H02K 5/22* (2006.01)

(58) Field of Classification Search
CPC ........ H02K 35/02; H02K 35/04; H02K 35/06;
H02K 33/00; H02K 33/02; H02K 33/14;
H02K 7/1869; H02K 7/1876; H02K
7/1892; H02K 33/16; H02K 33/18; H02K
3/52; B06B 1/00; B06B 1/02; B06B
1/0215; B06B 1/0223; B06B 1/0269;
B06B 1/0614; B06B 1/04; B06B 1/045
USPC ................ 310/13, 15, 25, 12.31, 71, 12.16,
310/12.01–12.27, 81, 80, 321, 20, 21,
310/28–30, 36–37; 381/400–422;
359/824
See application file for complete search history.

(56) References Cited

U.S. PATENT DOCUMENTS

| | | | | |
|---|---|---|---|---|
| 7,671,493 | B2 * | 3/2010 | Takashima | B06B 1/045 |
| | | | | 310/12.16 |
| 8,188,623 | B2 * | 5/2012 | Park | H02K 33/16 |
| | | | | 310/12.01 |
| 9,906,109 | B2 * | 2/2018 | Endo | H02K 33/16 |
| 2011/0018364 | A1 * | 1/2011 | Kim | H02K 33/18 |
| | | | | 310/17 |
| 2011/0018365 | A1 * | 1/2011 | Kim | B06B 1/045 |
| | | | | 310/17 |
| 2011/0133577 | A1 * | 6/2011 | Lee | H02K 33/18 |
| | | | | 310/15 |
| 2012/0013202 | A1 * | 1/2012 | Lee | H02K 41/0356 |
| | | | | 310/12.16 |
| 2012/0169148 | A1 * | 7/2012 | Kim | H02K 33/16 |
| | | | | 310/25 |
| 2013/0200732 | A1 * | 8/2013 | Jun | H02K 33/00 |
| | | | | 310/25 |
| 2014/0132089 | A1 * | 5/2014 | Jeon | H02K 33/16 |
| | | | | 310/14 |
| 2015/0194870 | A1 * | 7/2015 | Kim | H02K 33/18 |
| | | | | 310/25 |
| 2016/0190903 | A1 * | 6/2016 | Ohishi | H02K 35/04 |
| | | | | 310/28 |
| 2017/0033652 | A1 * | 2/2017 | Mao | H02K 33/16 |
| 2017/0033653 | A1 * | 2/2017 | Wang | H02K 33/16 |
| 2017/0033673 | A1 * | 2/2017 | Wang | H02K 33/16 |
| 2017/0117790 | A1 * | 4/2017 | Mao | H02K 1/34 |
| 2017/0141664 | A1 * | 5/2017 | Kuroda | H02K 33/00 |
| 2017/0288523 | A1 * | 10/2017 | Katada | H02K 33/16 |
| 2017/0354992 | A1 * | 12/2017 | Katada | H02K 33/16 |
| 2018/0026514 | A1 * | 1/2018 | Mao | H02K 41/0354 |
| | | | | 310/12.16 |

* cited by examiner

LINEAR MOTOR WITH ELECTRIC CURRENT INJECTION ASSEMBLY WITH SPRINGS CONNECTED TO MOVABLE COIL INSIDE A MASS BLOCK AND UPPER AND LOWER STATIONARY MAGNETS

CROSS REFERENCE

This application is based upon and claims priority to Chinese Patent Application No. 201610187267.5 filed on Mar. 29, 2016 and titled "A LINEAR MOTOR", the entire content of which is incorporated herein by reference.

TECHNICAL FIELD

The present invention relates to a horizontal vibration micro motor, which pertains to the technical field of linear vibration motors.

BACKGROUND TECHNOLOGY

Portable consumer electronic products such as mobile phones, tablet computers and handheld game consoles are becoming more and more popular with consumers. These electronic products normally use vibration signal as feedback information, for example, mobile phones have incoming call reminder, and handheld game consoles have vibration feedback. The vibration feedback function has become the most important application of vibration motors in the field of consumer electronics.

The structure of a linear vibration motor in prior art is as follows: a suspension component is made of a magnet and a high specific gravity alloy mass block, a coil is fastened on a bottom plate of a housing, the suspension component is provided inside the housing and is driven by electromagnetic force to move back and forth in a direction parallel to the bottom plate of the housing. This type of structure is generally called a "moving-magnet" structure, but it has a major disadvantage: when the magnetic induction line of the magnet directly faces the coil and is perpendicular to the coil, the generated electromagnetic force is parallel to the bottom plate, and thus the coil is driven by electromagnetic force to move parallel to the bottom plate; however, because the magnetic induction line generated by the magnet is arc-shaped, when the magnet moves to either of the two lateral sides, the magnetic induction line is not perpendicular to the coil, and thus the generated electromagnetic force has a horizontal force component parallel to the bottom plate of the housing as well as a vertical force component perpendicular to the bottom plate of the housing, wherein the vertical force component causes the magnet to move in a vertical direction of the housing. The vertical direction refers to the thickness direction of the housing, along which the thin-type linear motor has a smallest dimension with very narrow space, and as a result, the suspension component collides with the housing in its vertical motion and causes noise.

Meanwhile, during use of a linear motor, a metal plate made of high magnetic conductivity material such as ferrum, cobalt, nickel is provided adjacent to an outer side of the housing, and since the suspension vibrator contains magnet, under the influence of attraction force of this magnetic metal plate, the vibrator tends to deviate from its normal balance position. In a situation of severe attraction force, the vibrator would be "stuck to" the housing surface, causing vibration failure of the motor that loses vibration function. In order to solve this problem, in prior art, a shield plate with high magnetic conductivity is fixed onto the housing surface on each of the two sides of the suspension component so as to shield any influence of external magnetic field towards the suspension component inside the motor and minimize the deviation degree of the suspension component towards the housing. However, the shield plate itself has high magnetic conductivity and tends to attract the magnet within the suspension component. The two shield plates on both sides of the suspension component simultaneously attract the suspension component, and it is very difficult for the magnet mounted on the mass block to be arranged such that the attraction forces of the two shield plates towards the vibrator's magnet are exactly equal, therefore, in a situation of uneven force, the suspension component would move in the thickness direction of the housing and thus collide with the housing.

SUMMARY OF THE INVENTION

Therefore, one objective of the present invention is to overcome the deficiency that the suspension components of linear motors in prior art tend to collide with the housing and cause noise, by providing a moving-coil structured linear motor with the magnets fixed stationary.

A linear motor comprises a housing having an accommodation space; a mass block suspended in the accommodation space of the housing by an elastic member; a coil fastened on the mass block; and a magnet component comprising a first magnet and a second magnet that have opposite magnetic poles and are symmetrically disposed at an upper side and at a lower side relative to the coil in the middle and positioned parallel to the centric plane of the coil. When the coil is energized, the electromagnetic interaction between the coil and the magnet component generates an electromagnetic force to drive the mass block with the coil to vibrate back and forth in a substantially horizontal direction.

The linear motor further comprises an electric current injection assembly which includes a first fasten plate fastened on the housing and provided with a third contactor extending out of the housing and a first contactor located inside the housing, the third contactor being adapted for introducing external electric current; a movable plate mounted on the mass block, for moving synchronously with the mass block and provided with a second contactor, the coil being fastened on the movable plate and located between the movable plate and the mass block; and an electrode spring interconnecting the first contactor and the second contactor.

The first fasten plate and/or the movable plate is a flexible plate.

The mass block is provided with an accommodation cavity, and the coil is located within the accommodation cavity.

The opening of the accommodation cavity is provided with step portions, and two ends of the movable plate are lapped at the step portions so that the coil mounted on the movable plate is embedded within the accommodation cavity.

The second contactor of the movable plate has hook-shaped structures clamped on both end walls of the mass block in the reciprocating vibration direction, and is located within the vibration space formed between the mass block and side walls of the housing.

The two end walls of the mass block in the reciprocating vibration direction are respectively provided with a recessed portion, and the second contactor is accommodated by fitting inside the recessed portion.

The linear motor further comprises a second fasten plate, the movable plate being located between the second fasten plate and the mass block, and the second fasten plate is fastened by fitting onto the mass block so as to prevent the movable plate from slipping off.

The first magnet is a plurality of upper magnetic steel pieces fastened on a bottom surface of an upper cover of the housing, and the second magnet is a plurality of lower magnetic steel pieces fastened on a lower cover of the housing.

The housing is formed with an open hole, and the third contactor is arranged to extend out of the housing through the open hole.

The first contactor, the second contactor and the third contactor are Flexible Printed Circuit cable connectors.

The technical solutions of the present invention have the following advantages:

1. In the linear motor provided by the present invention, a coil is fastened on a mass block that is suspended inside a housing, a first magnet and a second magnet that have opposite magnetic poles are symmetrically disposed at an upper side and at a lower side relative to the coil in the middle and positioned parallel to the centric plane of the coil, by arranging an upper magnetic steel and a lower magnetic steel at an upper side and at a lower side relative to the mass block in the middle and parallel to the mass block.

In the linear motor of the present invention, the design route is different from the traditional route of magnet motion driving mass block motion, but instead is coil motion driving mass block motion. When the coil moves to either of the two lateral sides of the housing, both the first magnet and the second magnet simultaneously generate forces along a vertical direction of the housing, and as the first magnet and the second magnet having opposite magnetic poles are symmetrically disposed on both sides of the coil, the electromagnetic forces generated by the two magnets are equal in magnitude and opposite in direction, thus being counterbalanced with each other in the vertical direction, so as to ensure that the coil only moves back and forth in a horizontal direction, without generating vibration in a vertical direction, therefore, no noise related to vertical vibration is caused.

In the meantime, when the linear motor provided by the present invention is used in a highly magnetic environment, even if magnetic shielding plates for shielding external magnetic induction lines are glued on both outer sides of the housing adjacent to where the magnets are fastened, because the magnets are fixed stationary themselves, no vertical deviation of the magnets due to influence of the shielding plates like in prior art occurs. Meanwhile, even if the magnetic shielding plates exert vertical forces on the coil, because such forces exerted by the shielding plates on the coil are very small, they are hardly able to drive the coil to move in the vertical direction, and thus no vertical deviation of the coil is caused, so that vibration noise is avoided.

2. The linear motor provided by the present invention further comprises an electric current injection assembly which includes a first fasten plate fastened on the housing and provided with a third contactor extending out of the housing and a first contactor located inside the housing, the third contactor being adapted for introducing external electric current; a movable plate mounted on the mass block, for moving synchronously with the mass block and provided with a second contactor, the coil being fastened on the movable plate and located between the movable plate and the mass block; and an electrode spring interconnecting the first contactor and the second contactor.

Electric current is introduced through the third contactor of the first fasten plate, then flows through the first contactor into the electrode spring, and finally enters through the second contactor into the movable plate having the coil fastened thereon. Because the movable plate moves synchronously with the coil, it can timely provide the electric current to the coil.

It needs to be noted that, as the coil is moving back and forth, when introducing electric current to the coil, the adverse influence of the coil's movement towards the introduction of the electric current needs to be taken into consideration. One way is to introduce external electric current directly through conducting wires, however, when the coil moves, the conducting wires have to move back and forth along with the coil, therefore, a certain space must be reserved inside the housing where the conducting wires can stretch and contract, which causes the internal space of the motor to become crowded, and the conducting wires also tend to be damaged during repeated stretch and contraction.

In the present invention, an electrode spring is utilized to interconnect the movable plate and the first fasten plate, and the first fasten plate is connected to external power source for introducing external electric current. The first fasten plate does not move when the coil and the mass block vibrate, so that the introduced electric current is stable. Meanwhile, the movable plate is fastened on the mass block with the coil and moves along with the coil. The movable plate and the first fasten plate are interconnected by the electrode spring which ensures proper movement and restoration of the movable plate by its elastic action, so that the electric current is conducted stably inside the motor. The electrode spring can also assist to adjust vibration frequency of the mass block.

3. In the linear motor provided by the present invention, the mass block is provided with an accommodation cavity, and the coil is located within the accommodation cavity; the opening of the accommodation cavity is provided with step portions, and two ends of the movable plate are lapped at the step portions so that the coil mounted on the movable plate is embedded within the accommodation cavity.

By the configuration of the accommodation cavity and its step portions, the coil and the movable plate is accommodated within the mass block, so that space volume of the mass block is effectively utilized, which is favorable for miniaturization of the linear motor. Furthermore, because the coil is embedded within the accommodation cavity and the movable plate prevents the coil from slipping out of the accommodation cavity, the vibration stability is improved.

4. In the linear motor provided by the present invention, the movable plate is a flexible plate so as to protect the coil from being damaged. Furthermore, even if slight vibration of the coil in the vertical direction is caused by a manufacture error, such vibration can be buffered and absorbed by the flexible plate, and thus no noise is generated. In addition, the movable plate as a flexible plate can allow compression deformation, which is favorable for mounting another plate on the outer side of the movable plate to further secure the positioning of the movable plate on the mass block. The movable plate as a flexible plate can buffer slight vibrations caused by external environment during use of the motor, so that the third contactor on the first fasten plate can steadily conduct electric current in and out of the motor.

5. In the linear motor provided by the present invention, the second contactor of the movable plate has hook-shaped structures, the two end walls of the mass block in the reciprocating vibration direction are respectively provided with a recessed portion, and the second contactor is accommodated by fitting inside the recessed portion.

The recessed portion extends parallel to the end wall of the mass block, the second contactor is precisely fitted inside the recessed portion, and one end of the electrode spring extends parallel to the second contactor, therefore, during vibration of the mass block, the electrode spring is in close contact with the second contactor, so that transmission continuity of the electric current signal is ensured.

6. In the linear motor provided by the present invention, the housing is formed with an open hole, and the third contactor is arranged to extend out of the housing through the open hole, so that external electric current is introduced in for providing electric power to the coil.

BRIEF DESCRIPTION OF THE DRAWINGS

In order to more clearly describe the technical scheme in the specific embodiments of the present invention or in the prior art, hereinafter, the accompanying drawings required to be used in the description of the specific embodiments or the prior art will be briefly introduced. Apparently, the accompanying drawings described below are only directed to some embodiments of the present invention, and for those skilled in the art, without expenditure of creative labor, other drawings can be derived on the basis of these accompanying drawings.

Figure 1:
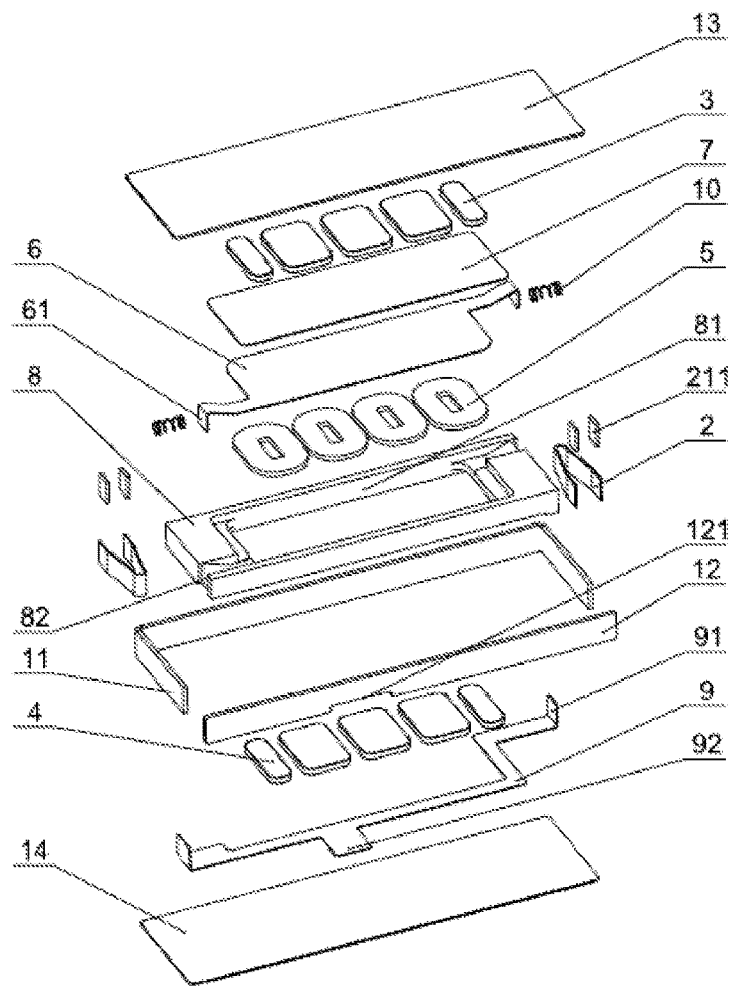
FIG. 1 is an exploded view of the linear motor provided in a first embodiment of the present invention.

REFERENCE NUMERALS 1-housing; 2-elastic member; 3-upper magnetic steel piece; 4-lower magnetic steel piece; 5-coil; 6-movable plate; 61-second contactor; 7-second fasten plate; 8-mass block; 81-accommodation cavity; 82-recessed portion; 9-first fasten plate; 91-first contactor; 92-third contactor; 10-electrode spring; 121-open hole; 13-upper cover; 14-lower cover; 211-blocking member.

DETAILED DESCRIPTION OF EMBODIMENTS

A clear and complete description of the technical scheme of the present invention is given below, in conjunction with the accompanying drawings. Apparently, the embodiments described below are a part, but not all, of the embodiments of the present invention. All the other embodiments, obtained by those skilled in the art on the basis of the embodiments described in the present invention without expenditure of creative labor, fall into the protection scope of the present disclosure.

In the description of the present disclosure, it needs to be noted that, terms such as "center", "above", "below", "left", "right", "vertical", "horizontal", "inside", "outside" refer to the orientation or positional relation based on the illustration of the drawings, which is merely for facilitating and simplifying the description of the present disclosure, not for indicating or implying that the referred apparatus or component must have a particular orientation or must be configured or operated in a particular orientation, therefore is not to be construed as a limitation towards the present invention. In addition, terms such as "first", "second", "third" are merely for the purpose of description, and are not to be construed as an indication or implication of relative importance thereof.

In the description of the present invention, it needs to be noted that, unless specifically defined or restricted otherwise, terms such as "mount", "interconnect", "connect" should be broadly construed, for example, they may be fixed connection or detachable connection or integral connection; they may be mechanical connection or electrical connection; they may be direct connection, or indirect connection via an intermediate medium, or internal communication between two units. For those skilled in the art, the specific meaning of the aforementioned terms in the present invention can be understood according to specific situations thereof.

Furthermore, the technical features involved in the various embodiments of the present invention described below can be combined with one another as long as they do not conflict with one another.

Embodiment 1

A linear motor, comprises a housing 1 having an accommodation space; a mass block 8 suspended in the accommodation space of the housing 1 by an elastic member 2; a coil 5 fastened on the mass block 8; and a magnet component comprising a first magnet and a second magnet that have opposite magnetic poles and are symmetrically disposed at an upper side and at a lower side relative to the coil 5 in the middle and positioned parallel to the centric plane of the coil 5. When the coil 5 is energized, the electromagnetic interaction between the coil 5 and the magnet component generates an electromagnetic force to drive the mass block 8 with the coil 5 to vibrate back and forth in a substantially horizontal direction.

Figure 4:
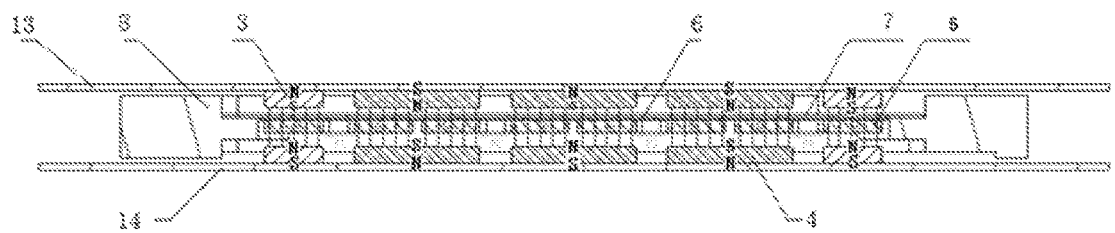
FIG. 4 is a working process view of the linear motor provided in the first embodiment of the present invention.

In the above-mentioned linear motor, the design route that utilizes the motion of the coil 5 to drive the motion of the mass block 8, is different from the traditional route that utilizes magnet motion to drive mass block motion. As shown in FIG. 1 or FIG. 4, when the coil moves to either of the two lateral sides of the housing, both the first magnet and the second magnet simultaneously generate forces along a vertical direction of the housing, and as the first magnet and the second magnet having opposite magnetic poles are symmetrically disposed on both sides of the coil, the electromagnetic forces generated by the two magnets are equal in magnitude and opposite in direction, thus being counterbalanced with each other in the vertical direction, so as to ensure that the coil only moves back and forth in a horizontal direction, without generating vibration in a vertical direction, therefore, no noise related to vertical vibration is caused.

In the meantime, when the linear motor provided by the present invention is used in a highly magnetic environment, even if magnetic shielding plates for shielding external magnetic induction lines are glued on both outer sides of the housing adjacent to where the magnets are fastened, because the magnets are fixed stationary themselves, no vertical deviation of the magnets due to influence of the shielding plates like in the prior art occurs. Meanwhile, even if the magnetic shielding plates exert vertical forces on the coil, because such forces exerted by the shielding plates on the coil are very small, they are hardly able to drive the coil to move in the vertical direction, and thus no vertical deviation of the coil is caused, so that vibration noise is avoided.

Figure 2:
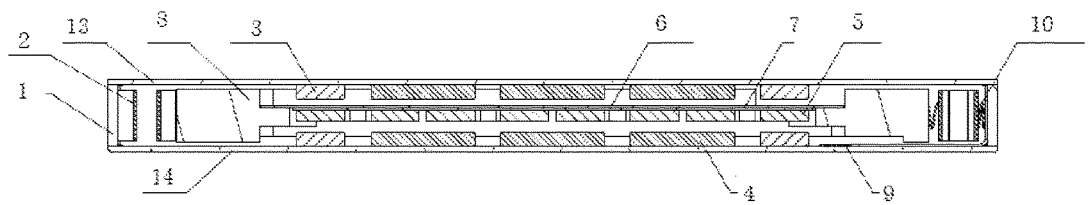
FIG. 2 is a sectional view of the linear motor provided in the first embodiment of the present invention.

As a preferred embodiment, as shown in FIG. 2, the coil 5 have multiple pieces that are arranged side by side along a common straight line in the horizontal direction, these multiple pieces of the coil 5 are connected in series.

Figure 3:
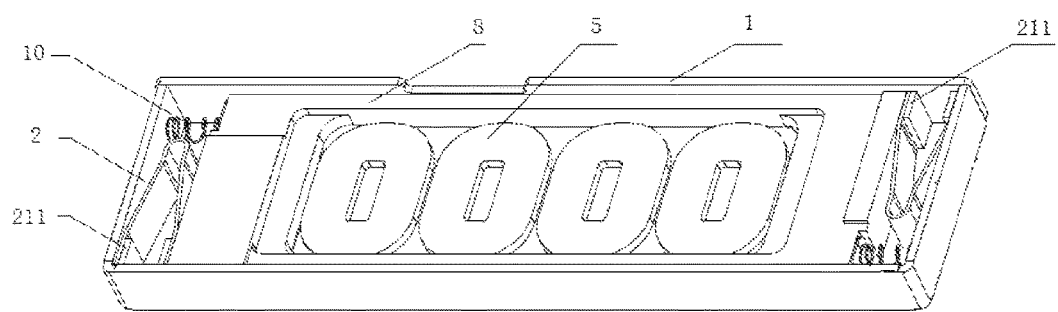
FIG. 3 is a structural diagram of the linear motor provided in the first embodiment of the present invention.

As a preferred embodiment, as shown in FIG. 1 or FIG. 3, the elastic member 2 consists of spring pieces located in the gaps between the housing 1 and each of the two lateral sides of the mass block 8 in the vibration direction. Along with the reciprocating movement of the mass block 8, the spring pieces are compressed or released, so as to provide driving force for the reciprocating movement of the mass block 8. The spring pieces are V-shaped, and two blocking members 211 are provided on the inner sides of the V-shaped opening of the spring pieces. As the blocking members 211 have certain elasticity themselves, after the spring pieces are compressed, the two blocking members 211 impact with each other and bounce off each other. Therefore, the blocking members 211 can adjust moving frequency of the mass block 8, when the blocking members 211 have larger thickness, the mass block 8 vibrates at a faster frequency; and when the blocking members 211 have smaller thickness, the mass block 8 vibrates at a slower frequency.

As a preferred embodiment, as shown in FIG. 1, the linear motor further comprises an electric current injection assembly which includes a first fasten plate 9 fastened in the housing 1 and provided with a third contactor 92 extending out of the housing 1 and a first contactor 91 located inside the housing 1, the third contactor 92 being adapted for introducing external electric current; a movable plate 6 mounted on the mass block 8, for moving synchronously with the mass block 8 and provided with a second contactor 61, the coil 5 being fastened on the movable plate 6 and located between the movable plate 6 and the mass block 8; and an electrode spring 10 interconnecting the first contactor 91 and the second contactor 61.

Electric current is introduced through the third contactor 92 of the first fasten plate 9, then flows through the first contactor 91 into the electrode spring 10, and finally enters through the second contactor 61 into the movable plate 6 having the coil 5 fastened thereon. Because the movable plate 6 moves synchronously with the coil 5, it can timely provide the electric current to the coil 5.

It needs to be noted that, as the coil 5 is moving back and forth, when introducing electric current to the coil 5, the adverse influence of the coil's movement towards the introduction of the electric current needs to be taken into consideration. One way is to introduce external electric current directly through conducting wires, however, when the coil 5 moves, the conducting wires have to move back and forth along with the coil, therefore, a certain space must be reserved inside the housing where the conducting wires can stretch and contract, which causes the internal space of the motor to become crowded, and the conducting wires also tend to be damaged during repeated stretch and contraction.

In the above-mentioned linear motor, an electrode spring 10 is utilized to interconnect the movable plate 6 and the first fasten plate 9, and the first fasten plate 9 is connected to external power source for introducing external electric current. The first fasten plate 9 does not move when the coil 5 and the mass block 8 vibrate, so that the introduced electric current is stable. Meanwhile, the movable plate 6 is fastened on the mass block 8 with the coil 5 and moves along with the coil 5. The movable plate 6 and the first fasten plate 9 are interconnected by the electrode spring 10 which ensures proper movement and restoration of the movable plate by its elastic action, so that the electric current is conducted stably inside the motor. The electrode spring 10 can also assist to adjust vibration frequency of the mass block.

Specifically, one end of the electrode spring 10 is fastened to the second contactor 61 by welding, so as to ensure that the electrode spring 10 does not detach from the second contactor 61 during vibration of the mass block 8; the other end of the electrode spring 10 is aligned to the first contactor 91, so as to ensure that the electric current signal is steadily conducted from the first contactor 91 to the second contactor 61.

As a preferred embodiment, the first fasten plate 9 and the movable plate 6 are both flexible plates.

The movable plate 6 is a flexible plate so as to protect the coil 5 from being damaged. Furthermore, even if slight vibration of the coil 5 in the vertical direction is caused by a manufacture error, such vibration can be buffered and absorbed by the flexible plate, and thus no noise is generated. In addition, the movable plate 6 as a flexible plate can allow compression deformation, which is favorable for mounting another plate on the outer side of the movable plate to further secure the positioning of the movable plate 6 on the mass block 8. The movable plate as a flexible plate can buffer slight vibrations caused by external environment during use of the motor, so that the third contactor on the first fasten plate can steadily conduct electric current in and out of the motor.

As a preferred embodiment, the mass block 8 is provided with an accommodation cavity 81, and the coil 5 is located within the accommodation cavity 81. The opening of the accommodation cavity 81 is provided with step portions, and two ends of the movable plate 6 are lapped at the step portions, so that an upper surface of the movable plate 6 is positioned within the accommodation cavity 81 and thus the coil 5 mounted on the movable plate 6 is embedded within the accommodation cavity 81.

By the configuration of the accommodation cavity 81 and its step portions, the coil 5 and the movable plate 6 is accommodated within the mass block 8, so that space volume of the mass block 8 is effectively utilized, which is favorable for miniaturization of the linear motor.

Specifically, as shown in FIG. 1, the second contactor 61 of the movable plate 6 has hook-shaped structures clamped on both end walls of the mass block 8 in the reciprocating vibration direction, and is located within the vibration space formed between the mass block 8 and side walls of the housing 1. The two end walls of the mass block 8 in the reciprocating vibration direction are respectively provided with a recessed portion 82, and the second contactor 61 is accommodated by fitting inside the recessed portion 82.

The recessed portion 82 is formed on the end wall of the mass block 8 and extends parallel to the end wall of the mass block 8, the second contactor 61 is precisely fitted inside the recessed portion 82, and one end of the electrode spring extends parallel to the second contactor 61, therefore, during vibration of the mass block 8, the electrode spring is in close contact with the second contactor 61, so that transmission continuity of the electric current signal is ensured.

As a preferred embodiment, the linear motor further comprises a second fasten plate 7, as shown in FIG. 1, the movable plate 6 is located between the second fasten plate 7 and the mass block 8, and the second fasten plate 7 is fastened by fitting onto the mass block 8 so as to prevent the movable plate 6 and the coil 5 from slipping out of the mass block 8.

Specifically, the second fasten plate 7 is fastened by fitting at an opening on the side of the mass block 8 with the step portions, the second fasten plate 7 covers the movable plate 6, and the second fasten plate 7 is fastened to the step portions by welding.

As a preferred embodiment, as shown in FIG. 1 or FIG. 2, the first magnet is a plurality of upper magnetic steel pieces 3 fastened on a bottom surface of an upper cover 13 of the housing 1, and the second magnet is a plurality of lower magnetic steel pieces 4 fastened on a lower cover 14 of the housing 1.

As a preferred embodiment, the housing is formed with an open hole 121, as shown in FIG. 1, and the third contactor 92 is arranged to extend out of the housing 1 through the open hole 121, so that external electric current is introduced in for providing electric power to the coil 5. Specifically, the open hole 121 is located at a lower side of the housing 1 corresponding to the lower cover 14, and the length of the open hole 121 is longer than the length of the third contactor 92.

As a preferred embodiment, the first contactor 91, the second contactor 61 and the third contactor 92 are Flexible Printed Circuit (FPC) cable connectors. The FPC cable connectors is designed to have a long strip shape with pluggable needles on the end portion for easy connection by plugging and unplugging Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. A linear motor comprising:
   a housing, having an accommodation space;
   a mass block, suspended in the accommodation space of the housing by a pair of V-shaped leaf springs respectively mounted in gaps between the housing and each of two lateral sides of the mass block in a vibration direction, wherein each of the V-shaped leaf springs comprises two spring leaf-sheets interconnected by a transition segment and having an intersection angle to each other, and, for each of the V-shaped leaf springs, two blocking members with elasticity are respectively provided on the inner sides of the two spring leaf-sheets facing each other;
   a coil, fastened on the mass block; and
   a magnet component, comprising a first magnet and a second magnet that have opposite magnetic poles and are symmetrically disposed at an upper side and at a lower side relative to the coil in the middle and positioned parallel to the centric plane of the coil;
   the linear motor configured such that, when the coil is energized, electromagnetic interaction between the coil and the magnet component generates an electromagnetic force to drive the mass block with the coil to vibrate back and forth in a substantially horizontal direction.

2. The linear motor according to claim 1, wherein the first magnet is a plurality of upper magnetic steel pieces fastened on a bottom surface of an upper cover of the housing, and the second magnet is a plurality of lower magnetic steel pieces fastened on a lower cover of the housing.

3. The linear motor according to claim 1, wherein the mass block is provided with an accommodation cavity, and the coil is located within the accommodation cavity.

4. The linear motor according to claim 3, wherein the opening of the accommodation cavity is provided with step portions, and two ends of the movable plate are lapped at the step portions so that the coil mounted on the movable plate is embedded within the accommodation cavity.

5. The linear motor according to claim 1, further comprising an electric current injection assembly which comprises:
   a first fasten plate, fastened on the housing and provided with a third contactor extending out of the housing and a first contactor located inside the housing, the third contactor being adapted for introducing external electric current;
   a movable plate, mounted on the mass block, for moving synchronously with the mass block and provided with a second contactor, the coil being fastened on the movable plate and located between the movable plate and the mass block; and
   an electrode spring, interconnecting the first contactor and the second contactor.

6. The linear motor according to claim 5, wherein the first fasten plate and/or the movable plate is a flexible plate.

7. The linear motor according to claim 5, further comprising a second fasten plate, the movable plate being located between the second fasten plate and the mass block, and the second fasten plate is fastened by fitting onto the mass block so as to prevent the movable plate from slipping off.

8. The linear motor according to claim 5, wherein the housing is formed with an open hole, and the third contactor is arranged to extend out of the housing through the open hole.

9. The linear motor according to claim 5, wherein the first contactor, the second contactor and the third contactor are Flexible Printed Circuit cable connectors.

10. The linear motor according to claim 5, wherein the second contactor of the movable plate is a hook-shaped structures clamped on each of two end walls of the mass block in the reciprocating vibration direction and is located within the vibration space formed between the mass block and side walls of the housing.

11. The linear motor according to claim 10, wherein the two end walls of the mass block in the reciprocating vibration direction are respectively provided with a recessed portion, and the second contactor is accommodated by fitting inside the recessed portion.

* * * * *